United States Patent [19]

Mittell

[11] 4,288,060
[45] Sep. 8, 1981

[54] SEQUENCED DRIVE FOR ROTARY VALVES

[75] Inventor: Larry C. Mittell, Palos Verdes Estates, Calif.

[73] Assignee: The United States of America as represented by the United States Department of Energy, Washington, D.C.

[21] Appl. No.: 106,130

[22] Filed: Dec. 21, 1979

[51] Int. Cl.³ .................. F16K 31/44; F16K 31/12
[52] U.S. Cl. .................................... 251/215; 251/56
[58] Field of Search .................. 251/215, 56, 228; 74/89

[56] References Cited

U.S. PATENT DOCUMENTS

| | | | |
|---|---|---|---|
| 1,656,184 | 1/1928 | Enz | 251/56 |
| 2,153,885 | 4/1939 | Goldberg et al. | 251/56 |
| 2,658,293 | 4/1972 | Gaebel | 251/228 |
| 3,843,090 | 10/1974 | Schneider et al. | 251/215 |

FOREIGN PATENT DOCUMENTS 1035431  7/1958  Fed. Rep. of Germany ........ 251/56

*Primary Examiner*—A. Michael Chambers
*Attorney, Agent, or Firm*—L. E. Carnahan; Roger S. Gaither; Richard G. Besha

[57] ABSTRACT

A sequenced drive for rotary valves which provides the benefits of applying rotary and linear motions to the movable sealing element of the valve. The sequenced drive provides a close approximation of linear motion while engaging or disengaging the movable element with the seat minimizing wear and damage due to scrubbing action. The rotary motion of the drive swings the movable element out of the flowpath thus eliminating obstruction to flow through the valve.

5 Claims, 9 Drawing Figures

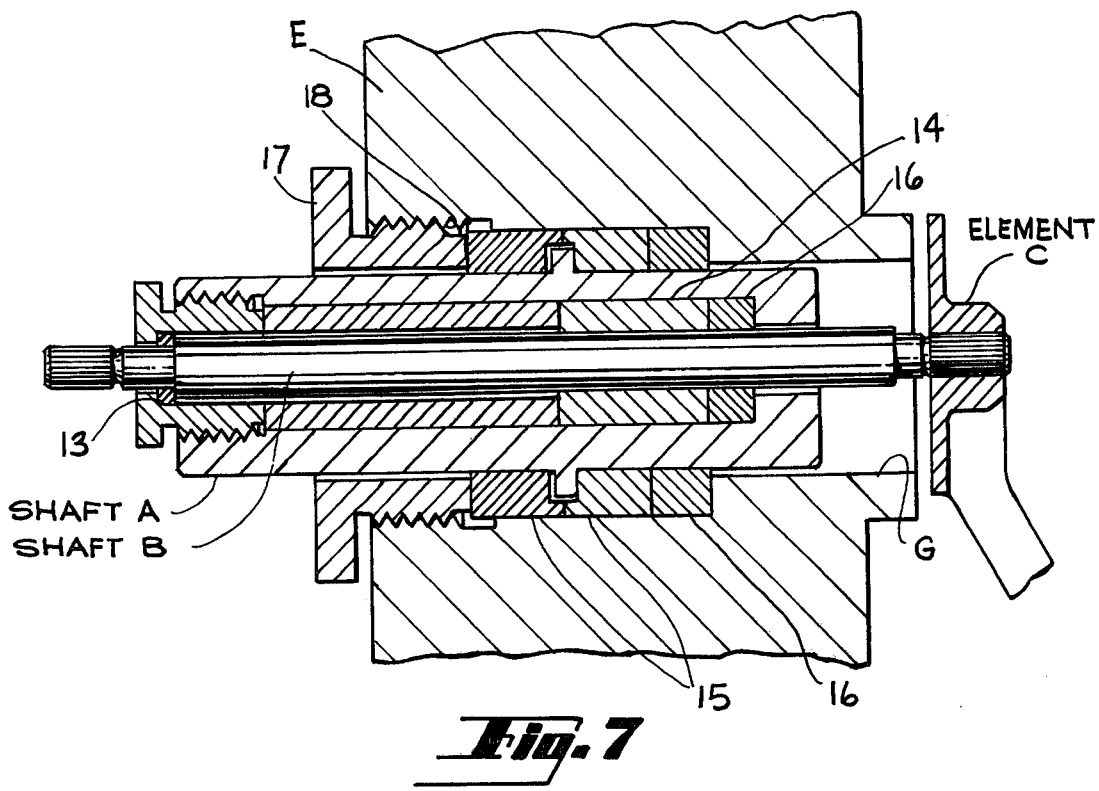
Fig. 7
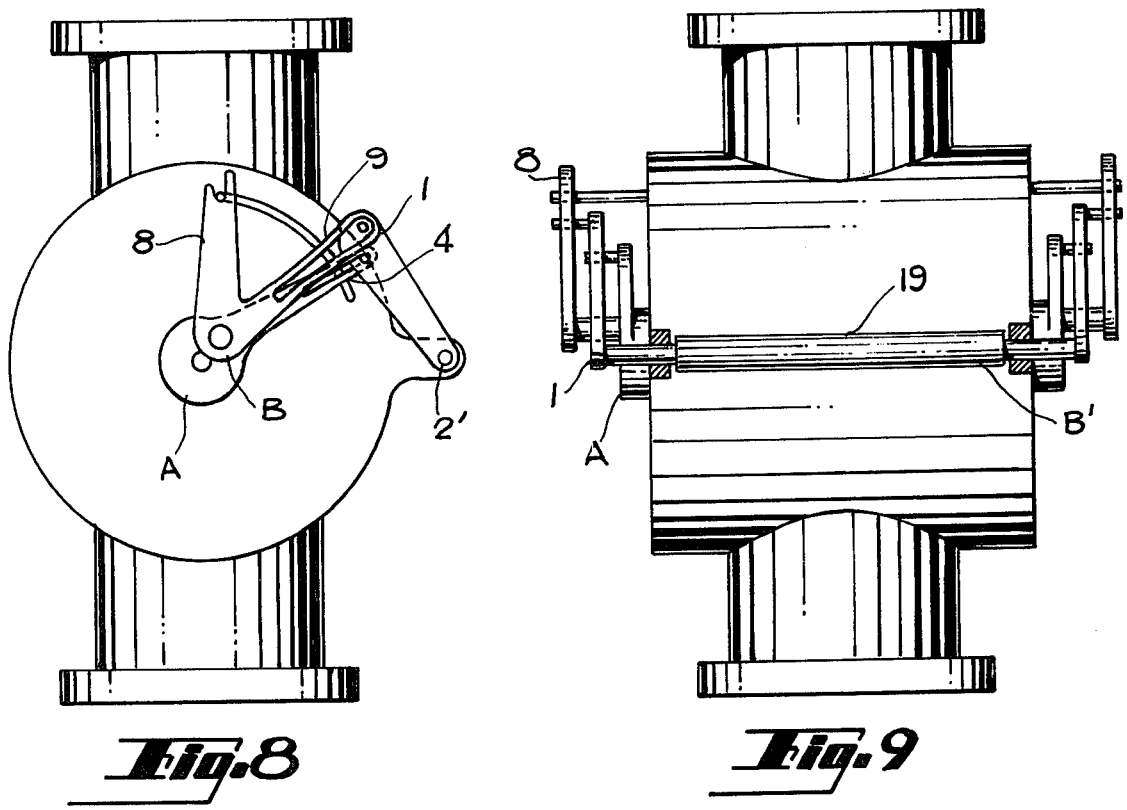
Fig. 8
Fig. 9

SEQUENCED DRIVE FOR ROTARY VALVES

BACKGROUND OF THE INVENTION

The invention described herein was made in the course of, or under, Contract No. EX-76-C-01-2356, with the U.S. Department of Energy.

The invention relates to rotary valves, particularly to a drive mechanism for rotary valves, and more particularly to a sequenced drive for such valves which provides both quasi-linear and rotary motions to the movable element of the valve.

The benefits of applying rotary and linear motions to the movable sealing element of a valve are well known: linear motion when engaging with or disengaging from the seat minimizes wear or damage due to scrubbing of the element against the seat, while rotary motion, used to swing the element out of the flowpath, leaves the flowpath unobstructed. Prior known mechanisms which provide this sequential motion usually have drawbacks such as dependence on delicate members that rely on friction or wedging actions, exposure to the flow medium, and complications arising from asymmetrical deflections and backlashes.

SUMMARY OF THE INVENTION

The present invention is directed to an improved sequenced drive for rotary valves which provides the advantages of rotary and linear motion to the movable sealing element, but overcomes the drawbacks of prior known sequenced drive mechanisms. This is accomplished by a shaft and linkage arrangement which smoothly and effectively provides linear translation and rotary movement of the sealing element with minimized damage to the valve seat and without obstructing the flowpath through the valve.

Therefore, it is an object of this invention to provide an improved sequenced drive for rotary valves.

A further object of the invention is to provide a mechanism capable of applying rotary and linear motions to the movable sealing element of a valve.

Another object of the invention is to provide a sequenced drive which includes a linkage and shaft mechanism which provides rotary and linear motions to the movable valve element which minimizes valve seat damage and flowpath obstruction.

Other objects of the invention will become readily apparent to those skilled in the art from the following description and accompanying drawings.

BRIEF DESCRIPTION OF THE DRAWINGS

FIG. 7 is a view partially in cross-section of an embodiment of a rotary valve to be driven by the sequenced drive of the invention; and FIGS. 8 and 9 illustrate end and side views, respectively, of the linkage for the rotary valve of the FIG. 1 embodiment to provide symmetry of the sequenced drive.

DETAILED DESCRIPTION OF THE INVENTION

The invention involved an improved sequenced drive mechanism for rotary valves which provides linear and rotary motions to the movable sealing member. The drive mechanism minimizes wear or damage due to scrubbing action with the valve seat, and minimizes flowpath obstruction. The sequenced drive mechanism of this invention overcomes the above-mentioned drawbacks of the prior known drive mechanisms for rotary valves.

Figure 1:
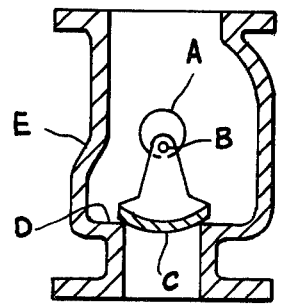
FIG. 1 illustrates an embodiment of a valve incorporating the sequenced drive of the inventions with the movable element in the seated position.
Figure 2:
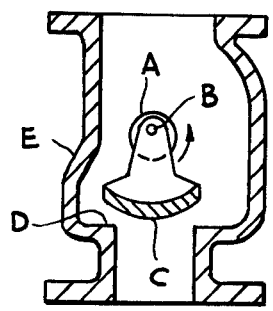
FIG. 2 illustrates the movable element of the FIG. 1 valve in the translation mode.
Figure 3:
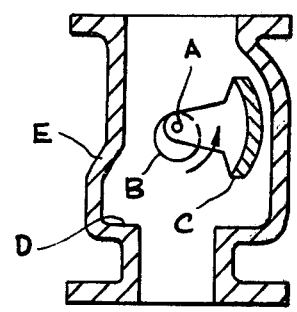
FIG. 3 illustrates the FIG. 1 valve with the movable element in the rotation mode.

The operating sequence of the valve, as illustrated in FIGS. 1-3, is as follows:

1. With the movable sealing element C in the seated position on valve seat D of housing E, as shown in FIG. 1, the mechanism, illustrated in FIGS. 4-6 and described hereinafter, rotates shaft A while restraining shaft B from rotation. Because element C is fixed to shaft B, restraint of shaft B prevents rotation of element C.

2. As rotation of shaft A occurs, element C translates away from seat D, as shown in FIG. 2, because of the eccentric mounting of shaft B in shaft A.

3. At the desired time, shaft B is rotated, thus swinging element C out of the flow path, as shown in FIG. 3.

The sequence, above described, is reversed to close the valve wherein element C is again positioned on seat D as shown in FIG. 1.

Figures 4, 5:
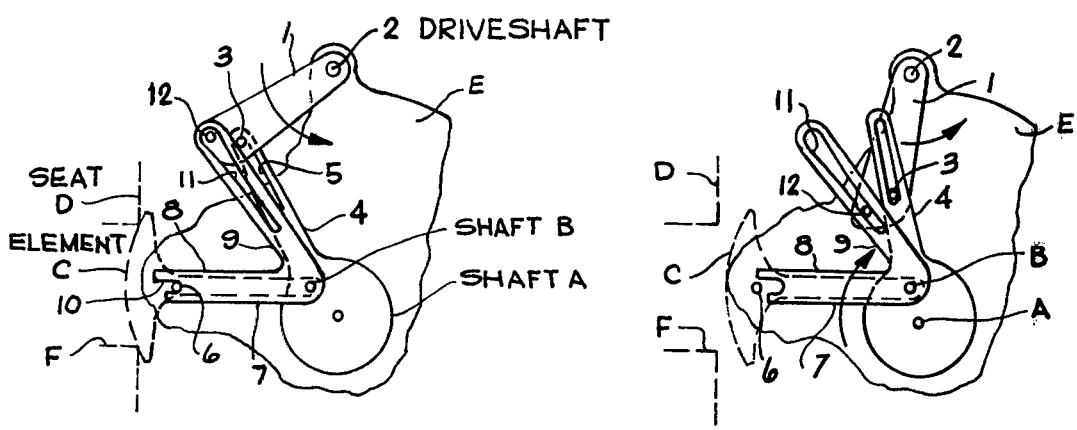
FIG. 4 shows an embodiment of the sequence drive mechanism of the invention for a valve, similar to FIG. 1, but of opposite direction of rotation, as translation on the movable element commences.
FIGS. 5 and 6 illustrate the sequence drive mechanism of the invention of FIG. 4 as it commences and completes, respectively, rotation of the movable element.
Figure 6:
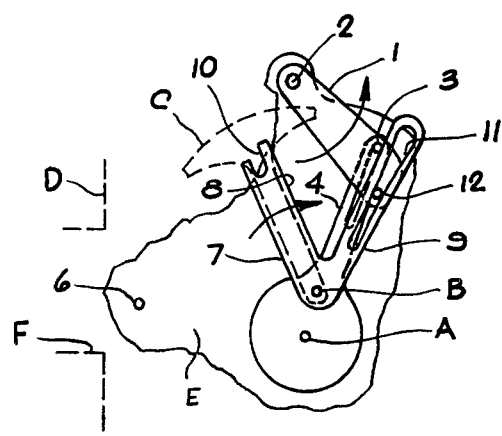

The linkage and shaft arrangement of the sequenced drive mechanism for a rotary valve similar to that illustrated in FIGS. 1-3 is illustrated in FIGS. 4-6 showing the translation and rotation sequence of the drive mechanism which provides the operating sequence of the valve as above described, but in opposite rotational direction compared to that of FIGS. 1-3; the sequence being as follows:

1. To open the valve element C. link 1 (the driving link), attached at one end to a driveshaft 2, indicated by legend, and connected at the other end via a cam follower or pin 3 to a link 4 fixedly connected to shaft A, link 4 having a slot 5 therein. Link 1 is rotated by drive shaft 2 in a counter-clockwise direction, as indicated by the direction arrow thereon, causing shaft A to be driven in a clockwise direction via cam follower 3. The rotation of the sealing element C is determined solely by the orientations of a cam follower or pin 6 (fixed in housing E) and shaft B. A link 7 is fixed to shaft B and consists of two arms 8 and 9, arm 8 having an open slot 10 in the end thereof which cooperates with cam follower 6, while arm 9 is provided with a slot 11 within which a cam follower or pin 12, fixed to link 1, is positioned, slot 11 having wide and narrow sections. If desired, slot 11 need not be closed as shown. Initial rotation of link 1 does not influence the rotation of element C because cam follower 12 (rigidly fixed to link 1) moves along the wide section of the slot 11 in arm 9 of link 7, whereby arm 9 is not moved. The result is that shaft B is restrained from rotation while shaft A is rotated (see FIG. 4). Therefore, element C moves away from seat D, translation position of FIG. 2, with essentially no rotation thereof.

2. Continued counter-clockwise rotation of link 1 results in simultaneous disengagement of slot 10 in arm 8 of link 7 from cam follower 6 and engagement of cam follower 12 with narrow section of slot 11 in arm 9 of link 7, as shown in FIG. 5, whereby element C commences clockwise rotation as indicated by the direction arrow. The rotation of element C is determined by the orientations of cam follower 12 on link 1, and shaft B. As link 1 continues to rotate, shaft B is rotated by cam follower 12 through arm 9 of link 7, and element C rotates to the position shown in FIG. 6 providing essentially an unrestricted flowpath through the opening F in valve body E.

3. Reseating of element C on valve seat D results from clockwise rotation of link 1 by driveshaft 2, and the reverse of the above sequence of the linkage movement.

The entire sequenced drive mechanism of FIGS. 4–6, except for element C and an exposed end of shafts A and B, may be isolated from the flow medium passing through opening F in the valve body. FIG. 7 illustrates such an isolated shaft arrangement and consists of the shaft assembly positioned in an opening G of the valve body E. The shaft assembly, in addition to shafts A and B, comprises a thrust washer 13 and is positioned about shaft B at the end thereof opposite element C, a radial bearing assembly generally indicated at 14 located intermediate shafts A and B, combination radial/thrust bearings 15 positioned about shaft A, and shaft seals 16 positioned about shaft A and B, respectively. The shaft assembly is retained in opening G by a threaded retainer means 17 which cooperates with helical threads 18 in valve housing or body E.

The linkage, illustrated in FIGS. 4–6, may be arranged as shown in FIGS. 8 and 9, and consists of two mirror-image sets of linkage, one on each side of the valve body, with their driving links jointed by a drive shaft 2' running external to the valve having a central drive point 19. This arrangement has the following advantages:

1. No internal driveshafts or yokes are required.
2. By driving the driveshaft centrally, the arrangement is entirely symmetrical. This makes torsional deflections and backlash symmetrical, to assure precise synchronization of the two sets of linkage. This avoids, among other things, any tendency to twist the seating element.
3. The actuator, not shown, can drive the drive shaft through spur gears, bellcranks, rack-and-pinion, chain-and-sprocket, worm-and-pinion, "V" belts and other friction devices, or other gear systems. The actuator can be mounted at virtually any angle with respect to the drive shaft. In fact, in any single valve-actuator assembly, provisions can be made for universal mounting of the actuator.

It has thus been shown that the present invention provides a sequenced drive mechanism for rotary valves which provides the benefits of linear and rotary motions to the movable sealing element without the drawback of the prior known drive mechanisms and without complications arising from asymmetrical deflections and backlashes.

While a particular embodiment of the invention has been illustrated and described, modifications will become apparent to those skilled in the art, and it is intended to cover in the appended claims all such modifications as come within the spirit and scope of the invention.

What is claimed is:

1. A sequenced drive mechanism for producing linear and rotary motions in rotary valves having a housing within which is located a seat and a sealing element movable with respect to the seat, said sequenced drive mechanism comprising a first link adapted to be connected at one end thereof to a driving means and having a pair of spaced cam followers secured at the other end thereof, a first shaft, a second link having one end thereof connected to said first shaft and having a longitudinally extending slot in the other end thereof, one of said pair of spaced cam follows being located within said slot, a second shaft in offset coaxial arrangement with respect to said first shaft and operatively connected to said sealing element, a third link having a pair of angularly spaced, outwardly extending arms secured to said second shaft, one of said arms having an open slot in the outer end thereof and adapted to cooperate with a third cam follower fixedly secured to said valve housing, the other of said arms having a longitudinally extending slot therein having two sections of which one section is wider than the other, the other of said pairs of spaced cam followers being located within said last mentioned slot, such that initial rotation of said first link in one direction moves said second link causing rotation of said first shaft without rotation of said second shaft resulting in a translating of said sealing element in a direction substantially perpendicular with respect to said seat and moving said third link with respect to said third cam follower, and further rotation of said first shaft moves said third link causing rotation of said second shaft which produces rotation of said sealing element with respect to said seat.

2. In a valve comprising a housing having a flowpath therethrough, a valve seat located in said flowpath, and a movable sealing element operatively positioned therein to cooperate with said valve seat, the improvement comprising: means operatively connected to said movable sealing element for producing linear translation and rotary movement of said sealing element with respect to said valve seat without obstructing the flowpath through said housing, said means including a drive mechanism, a first shaft, a first linkage assembly operatively connecting said drive mechanism to said first shaft, a second shaft in offset coaxial relation with respect to said first shaft and adapted to move with rotation of said first shaft, said second shaft being operatively connected to said sealing element, a second linkage assembly operatively connected to said second shaft and having a pair of angularly extending arms, one of said arms being provided with means at the outer end thereof which is removably connected to a member fixed to said housing, the other of said arms being constructed to be operatively connected to said first linkage assembly, whereby initial rotation of said drive mechanism causes rotation of said first shaft via said first linkage assembly and movement of said second shaft and said second linkage assembly and linear movement of said sealing element without rotational movement of said sealing element and said second linkage assembly, and wherein further rotation of said drive mechanism causes rotation of said second linkage assembly and rotation of said sealing element.

3. The improvement defined in claim 2, wherein said first linkage assembly consists of a first link connected at one end to said drive mechanism and having a pair of spaced cam followers secured at the other end thereof, and a second link having one end connected to said first shaft and the other end thereof operatively cooperating with one of said pair of spaced cam followers; and wherein said other of said arms of said second linkage assembly operatively cooperates with the other of said pair of spaced cam followers of said first linkage assembly.

4. The improvement defined in claim 3, wherein said other of said arms of said second linkage assembly is provided with a longitudinally extending slot having two sections of which one section is wider than the other section, and wherein said other of said pair of spaced cam followers of said first link of said first linkage assembly is located within said slot of said other of said arms of said second linkage assembly such that initial rotation of said first link in one direction moves said second link via said one of said pair of spaced cam followers causing rotation of said first shaft, and such that said other of said pair of cam followers move along at least said one section of said slot in said other of said arms of said second linkage assembly without causing rotationally movement of said second linkage assembly, and further rotation of said first link in said one direction causes rotation of said second linkage assembly via said other of said pairs of cam followers.

5. The improvement defined in claim 4, wherein said means at the outer end of one of said arms of said second linkage assembly includes a slot in said outer end thereof which cooperates with a pin constituting said member fixed to said housing; and wherein said second link of said first linkage assembly is provided with a longitudinally extending slot within which said one of said pair of cam followers is located.

* * * * *